(12) United States Patent
Ford

(10) Patent No.: US 8,306,869 B2
(45) Date of Patent: *Nov. 6, 2012

(54) SYSTEM AND METHOD FOR MANAGING COMMODITY TRANSACTIONS

(76) Inventor: Robert M. Ford, St. Joseph, MO (US)

(*) Notice: Subject to any disclaimer, the term of this patent is extended or adjusted under 35 U.S.C. 154(b) by 373 days.

This patent is subject to a terminal disclaimer.

(21) Appl. No.: 12/583,166

(22) Filed: Aug. 14, 2009

(65) Prior Publication Data

US 2009/0313052 A1  Dec. 17, 2009

Related U.S. Application Data

(60) Continuation of application No. 11/034,293, filed on Jan. 12, 2005, now Pat. No. 7,577,606, which is a division of application No. 09/330,446, filed on Jun. 11, 1999, now Pat. No. 6,862,580.

(51) Int. Cl.
*G06Q 30/00* (2012.01)
(52) U.S. Cl. ...................................... 705/26.4
(58) Field of Classification Search ............... 705/26.4
See application file for complete search history.

(56) References Cited

U.S. PATENT DOCUMENTS

| | | | |
|---|---|---|---|
| 4,752,877 A | 6/1988 | Roberts et al. | |
| 5,758,328 A | 5/1998 | Giovannoli | |
| 5,835,896 A | 11/1998 | Fisher et al. | |
| 5,970,479 A | 10/1999 | Shepherd | |
| 5,974,403 A | 10/1999 | Takriti et al. | |
| 6,026,383 A | 2/2000 | Ausubel | |
| 6,047,274 A | 4/2000 | Johnson et al. | |
| 6,105,000 A | 8/2000 | Hickman et al. | |
| 6,169,979 B1 | 1/2001 | Johnson | |
| 6,216,956 B1 | 4/2001 | Ehlers et al. | |
| 6,266,651 B1 | 7/2001 | Woolston | |
| 6,862,580 B1 | 3/2005 | Ford | |
| 7,577,606 B1 | 8/2009 | Ford | |

FOREIGN PATENT DOCUMENTS

WO  WO98/26363  6/1998

OTHER PUBLICATIONS

"Bargaining With Mother Nature—GuaranteedWeather. A New Direction In Weather-Risk Risk Management.", UtiliCorp United Inc., Feb. 1998.
"Managing Energy KC Region Surfaces as America's Epicenter",Ingram's, pp. 44-52, Mar. 1999.
"Energy Insurance Brokers", 1997, http://electricnet.com/cofolder/engyins.htm.

(Continued)

*Primary Examiner* — Susanna M Meinecke Diaz
(74) *Attorney, Agent, or Firm* — Brandon N. Sklar, Esq.; Kaye Scholer LLP

(57) ABSTRACT

Methods and systems for managing the sale of commodities, such as tier-priced commodities, are described. Risk is managed by bundling with the commodity a financial instrument designed to indemnify against the risks associated with purchasing the commodity. The financial instrument may be an insurance instrument, for example. In one embodiment, bundled products are offered for sale to two or more bidders, at respective offer prices. The bidder that exceeds their respective offer price by the greatest amount is sold the bundled product. Different prices may be offered to different purchasers for respective bundled products. The offers, bids, and determination of who wins the bidding may be made by processors or computers coupled to networks, such as the Internet.

19 Claims, 8 Drawing Sheets

OTHER PUBLICATIONS

Preferred Energy Services, Inc., "Experts in Utility Cost Control", 1997, http://www.prefenergy.com.

Preferred Energy Services, Inc. , "Energy Procurement", (undated) printed Feb. 19, 1999, http://www.prefenergy.com.

"Power Surge How One Company is Transforming the Energy Industry", Fortune, Advertising Insert S1-S4, Mar. 29, 1999.

Tom Patterson; "Power Play: Mandate Leads to Internet Market for Electricity"; Electronic Commerce Advisor, pp. 17-24, Nov./Dec. 1998.

Downes, John & Jordan Elliot Goodman; "Dirtionary of Finance and Investment Terms (4th Ed.)"; Barron's-Educational Series, Inc., pp. 68-71, 236-237, 390-391, and 450-453. Published in 1995.

"Cigna Property & Casualty Lanches New Cigna Power Products Unit"; PR Newswire, p. 0727PHM042, Jul. 27, 1998.

"New Line of Cigna Insurance Products Designed to Help Market Manage Risk"; Power Markets Week, vol. 69, No. 32, p. 4. Aug. 10, 1998.

"Cigna Announces Products to Insure Against Price Swings in Power Markets"; Global Power Report, vol. 76, No. 147, Aug. 7, 1998.

Gift Mullins, Ronald; "Cigna Unit Turns on the Power in Newest Risk Management Offering"; Journal of Commerce, INS section, p. 5A, Aug. 10, 1998.

Liu, Yuin-Hong; "A Study on the Application of Power Pool System in Taiwan—the England and Wales Experiences"; Power Generation Engineering Monthly, Issue 602 p. 9-25; 1998.

McLean, Bethany; "Need Electricity? Call Your Broker"; Fortune; United States, Sep. 29, 1997.

Gill, Douglas; "Marketer-movers"; Oil & Gas Inventor, vol. 13n2;pp. 44-49, Feb. 1993; United States.

Richter, Jr., Charles W. and Sheble, Gerald B.; "Bidding Strategies that Minimize Risk with Options and Future Contracts"; Proceeding of the 1998 American Power Conference; Apr. 1998.

Wolak, Frank A.; "An Empirical Analysis of the Impact of Hedge Contracts on Bidding Behavior in a Competitive Electricity Marker"; Draft prepared for the Fourth Annual Power Research Conference, Berkeley, California, Mar. 5, 1999.

http://www.fiafii.org/tutorial/professional4.htm; "Futures Industry Institute: Introduction: Market Institutions and Professionals"; Copyrighted 1998. Downloaded Mar. 9, 2001.

http://soc-dlco.lm.com/Download/Documents/DLC_RFP.HTML: "Request for Proposals: Soicitations for Bids to Purchase Firm Power from Duquesne Light Company."; Jun. 1997. Downloaded Mar. 8, 2001.

Oren et al; "Interruption for Generation and Distribution of Electric Power.", Journal of Regulatory Economics, vol. 2, No. 1, pp. 15-19, 1990.

Bushnell et al.; "Bidder Cost Revelation in Electric Power Auctions. ", Journal of Regulatory Economics, vol. 6, No. 1, pp. 5-26, 1994.

Chao et al.; "Priority Service: Pricing, Investment, and Market Organization." American Economic Review, vol. 77, No. 5, pp. 899-916, 1987.

Deng et al.; "Priority Network Access Pricing for Electric Power.", Journal of Regulatory Economics, vol. 19, No. 3, pp. 239-270, 2001.

Strauss et al.; "Priority Pricing of Interruptible Electric Service With an Early Notification Option.", Energy, vol. 14, No. 2, pp. 175(22), 1993.

Doucet; "Coordination of Non-Utility Generation Through Priority Purchase Contracts." Energy Journal, vol. 15, No. 1, pp. 179(13), 1994.

Doucet et al. "Onsite Backup Generation and Interruption Insurance for Electricity Distribution." Energy Journal, vol. 12, No. 4, p. 79(15), 1991.

SYSTEM AND METHOD FOR MANAGING COMMODITY TRANSACTIONS

RELATED APPLICATIONS

The present application is a continuation of U.S. patent application Ser. No. 11/034,293, which was filed on Jan. 12, 2005 and will issue on Aug. 18, 2009 bearing U.S. Pat. No. 7,577,606, which is a division of U.S. patent application Ser. No. 09/330,446, which was filed on Jun. 11, 1999 and issued on Mar. 1, 2005 bearing U.S. Pat. No. 6,862,580, both of which are incorporated by reference, herein.

FIELD OF THE INVENTION

The present invention relates to a system and method for managing the sales of a commodity within a tiered pricing structure. More particularly, the present invention relates to a system and method for managing the risks and costs of delivering a commodity from a less expensive tier by use of a financial instrument to indemnify against loss from risks associated with purchasing a commodity from that tier.

BACKGROUND OF THE INVENTION

Deregulation of the various utility industries is creating new opportunities for utility customers to reduce their cost of purchasing water, electricity, natural gas and telecommunications services. Traditionally, because of government regulation, customers in a given geographic area were restricted to purchasing their utilities from single sources (i.e. there was no choice as to where a consumer could buy his or her power, all of a consumer's electricity came from a single local electric utility). Today, most power (primarily electricity) customers rely on what is referred to as "firm" power provided by their local utility companies.

Considering electricity as an example, "firm electric power" means electricity is delivered to the customer on a non-interruptible high-priority basis (i.e. 24 hours a day, 7 days a week throughout the year). Electric utilities must supply electricity to its firm power customers on demand. Because of its guaranteed availability, this is the most expensive long term contractual power a customer may purchase. An alternative to this is for the customer to purchase "interruptible power". Because interruptible power rates are generally substantially lower than firm power rates, the customer can realize a significant savings. The downside to the use of interruptible power by the customer is that it may not be available when the customer needs or wants it and therefore the customer or the customer's utility provider may be forced to buy power from an alternative source (also referred to as "spot" power). Spot power is typically much more expensive than interruptible or firm power and it may not be economically feasible for a customer to buy spot power for short durations when their interruptible power is unavailable.

The distinction between interruptible electric power and firm electric power creates a two-tiered pricing structure for electricity as a commodity (there are additional sub-tiers such as industrial, retail, and utility-to-utility power). Traditionally, if an electric power customer wanted to take advantage of low cost interruptible power they would have to gamble that the additional costs due to having to purchase spot power during an interruption would not be greater than the savings attributed to using interruptible power. Because most interruptions in interruptible electric power are due to seasonal weather (heat in particular) changes it is possible to estimate from historical data how much spot power a customer may have to purchase during a given period of time.

One method of dealing with the risk interruptions would be to set aside, hopefully in some type of profitable investment, an amount of money equivalent to the estimated costs of purchasing spot power for the predicted interruptions. While a possible solution, this method would be difficult for the average utility customer to implement because of the lack of available information and skill with determining the frequency of interruptions. Another option, if available, would be to purchase interruptible power during the time of year when interruptions are unlikely and buy firm power when interruptions are likely to occur. While better than purchasing nothing but interruptible power, this method does not provide the same savings as it is possible to realize using a larger percentage of interruptible power and it is still possible to be surprised by interruptions requiring the customer to buy spot power.

SUMMARY OF THE INVENTION

One embodiment of the present invention teaches a method for managing the sales of a tier-priced commodity, such as electricity. In one example, the method comprises determining the prices of the commodity at the available tiers and determining the price of a financial instrument, such as an insurance instrument, to indemnify the risk. The risk may vary based on the purchaser. The commodity at the lower tier is bundled with the insurance instrument and a price for the bundled product is determined based, at least in part, on the price of the commodity at the lower tier and the price of the insurance instrument. The insurance instrument may cover the cost of any potential loss incurred by the purchase of the commodity at a given tier, including the cost of purchasing the commodity from an alternative source. For example, it may be necessary for a utility selling the commodity to purchase the commodity on the spot market, at higher prices than the lower tier price, for example. While the invention discussed herein may be applied to numerous tier-priced commodities and services for which there is a quality of service distinction (i.e. telecommunications services, such as telecommunications bandwidth), the preferred embodiment discussed herein will focus on the management of the sales of electrical power.

The transaction may be carried out between the seller of electrical power and the customer, both wholesale (another utility, a municipality, rural cooperative or large manufacturing concern) and retail (individual consumers), via a seller's computer and a customer's computer over a computer network, for example.

In another embodiment, the customer, through the use of a personal computer, compares the cost of a commodity from different sources and financial instruments from different sources which may be purchased to indemnify against loss caused by risks associated with the commodity from different sources. Typically, the cost of the commodity and the financial instrument will vary depending upon the amount being purchased, the location of the customer, transportation variables, the capacity of the commodity provider and other factors.

In another embodiment, online auctions are conducted to sell a commodity and a bundled financial instrument, such as an insurance instrument, to indemnify against loss associated with at least one risk related to purchase of the commodity by respective bidders, to the highest bidder. In one example, a system to manage the sale of a commodity bundled with an insurance instrument is disclosed. The system comprises memory to store prices for respective bundled products comprising a commodity and a respective insurance instrument to indemnify against loss associated with at least one risk related to the purchase of the commodity by respective bidders. A processor is coupled to the memory. The processor is programmed to provide each bidder a respective price for a respective bundled product. The processor is also programmed to determine which of the bids received from bidders exceeds the respective price provided to each bidder, by a greater amount. The bundled product is sold to that bidder. In another example of a related embodiment, the memory stores commodity price data and insurance valuation data, and the processor, which is coupled to a network, is programmed to determine a respective price for respective bundled products for each of a plurality of bidders.

In accordance with one embodiment, a method of managing a sale of a commodity is disclosed comprising providing, by a first processor, over a network, a respective price for a respective bundled product to respective second processors of a plurality of bidders, each bundled product comprising a commodity and a financial instrument to indemnify against loss associated with at least one risk related to purchase of the commodity by a respective bidder. The method further comprises displaying to a respective bidder the respective price for the respective bidder, by a respective display coupled to each respective processor, and receiving, by the first processor, via the network, bids for respective bundled products from at least some of the respective second bidders. The first processor determines which of the bidders exceeds their respective price by a greater amount and the respective bundled product is sold to that bidder.

The respective bundled product may be sold by the first processor. Respective prices may be determined by the first processor based, at least in part, on a price for the commodity for sale to each respective bidder with the at least one risk and a value for the financial instrument to indemnify each respective bidder. The values of respective financial instruments may be based, at least in part, on one or more factors associated with each respective bidder. The at least one risk may include a risk of interruptions in delivery to each bidder and respective insurance instruments may indemnify against loss associated with the interruptions. The financial instrument may be an insurance instrument. The commodity may be electricity, natural gas, water, and telecommunications services, for example.

In accordance with another embodiment, a method for managing the sale of a tier-priced commodity is disclosed comprising displaying to a first bidder a first price for a first bundled product comprising a commodity and a first insurance instrument to indemnify the first bidder against loss associated with at least one risk related to the purchase of the commodity, on a first display device coupled to a first processor. The method further comprises displaying to a second bidder a second price for a second bundled commodity comprising the commodity and a second insurance instrument designed to indemnify the second bidder against loss associated with at least one risk related to the purchase of the commodity, on a second display device different than the first display device, coupled to a second processor different from the first processor. Bids are received by a third processor different than the first and second processors, for the first bundled product from the first bidder and for the second bundled product from the second bidder, from the first and second processors, respectively. The third processor determines which of the first and second bidders exceeds their respective first and second prices by a greater amount. The method further comprises selling the first bundled product to the first bidder if the first bidder exceeds the first price by a greater amount than the second bidder exceeds the second price or selling the second bundled product to the second bidder if the second bidder exceeds the second price by a greater amount than the first bidder exceeds the first price.

The first price and the second price may be different. The at least one risk may include a risk of interruptions in delivery and the first and second insurance instruments may indemnify against loss associated with interruptions in delivery of the commodity to first and second bidders, respectively. The price of the first and second insurance instruments may be based, at least in part, on one or more factors associated with the first and second bidders, respectively. The bids may be received from the first and second processors, via at least one network. The at least one network may comprise the Internet. The commodity may be electricity, natural gas, water, and telecommunications bandwidth, for example.

In accordance with another embodiment, a method of managing a sale of a commodity is disclosed comprising receiving by a first computer associated with a first party a price for a bundled product comprising a commodity and a first financial instrument to indemnify against loss associated with at least one risk related to purchase of the commodity by the first party, via a first network. The method further comprises receiving by a second computer associated with a second party a second price for a bundled product comprising the commodity and a second financial instrument to indemnify against loss associated with at least one risk related purchase of the commodity by the second party, via a second network. A first bid is sent from the first computer, via the network and a second bid is sent from the second computer via the network. If the first party exceeds the first price by more than the second bid exceeds the second price, the first party receives the bundled product for the first price, and if the second party exceeds the second price by more than the first party exceeds the first price, the second party receives the bundled product for the second price.

The first and second networks may comprise the Internet. The first and second prices may be received from a third computer, via the Internet, and the first and second bids may be sent to the third computer, via the Internet.

Different prices may be provided to each bidder, for respective bundled products.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings in which.

DETAILED DESCRIPTION OF THE INVENTION

Reference will now be made to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications and equivalents as may be included within the spirit and scope of the invention as defined by the appended claims. In the following description, numerous specific details are set forth in order to provide a thorough understanding of the present invention. The present invention may be practiced without some or all of these specific details. In other instances, traditional process operations have not been described in detail in order to not unnecessarily obscure the present invention.

Figure 1A:
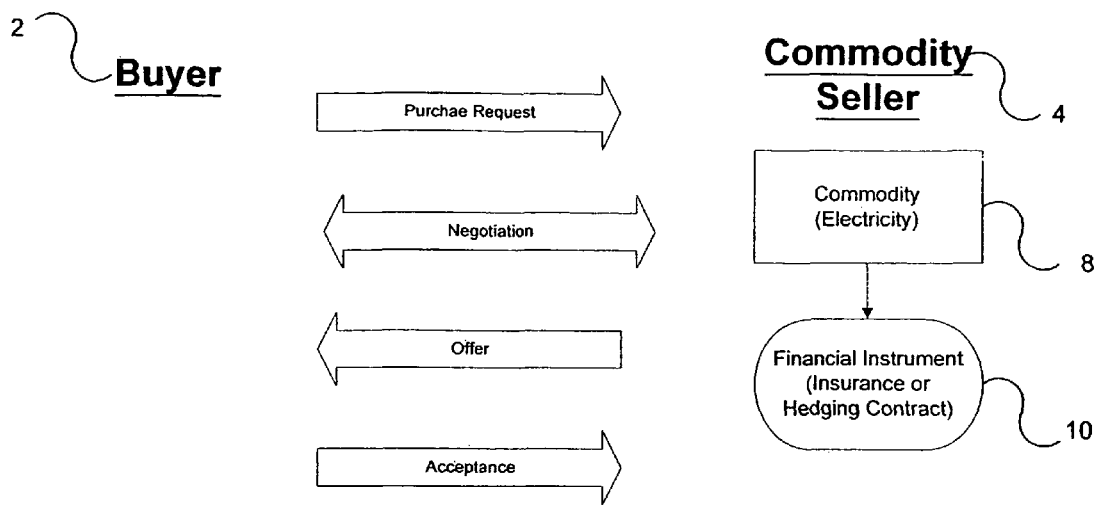
FIG. 1a is an overview description of the operational model of the present invention wherein a buyer purchases a combined commodity and financial instrument from a commodity seller.
Figure 1B:
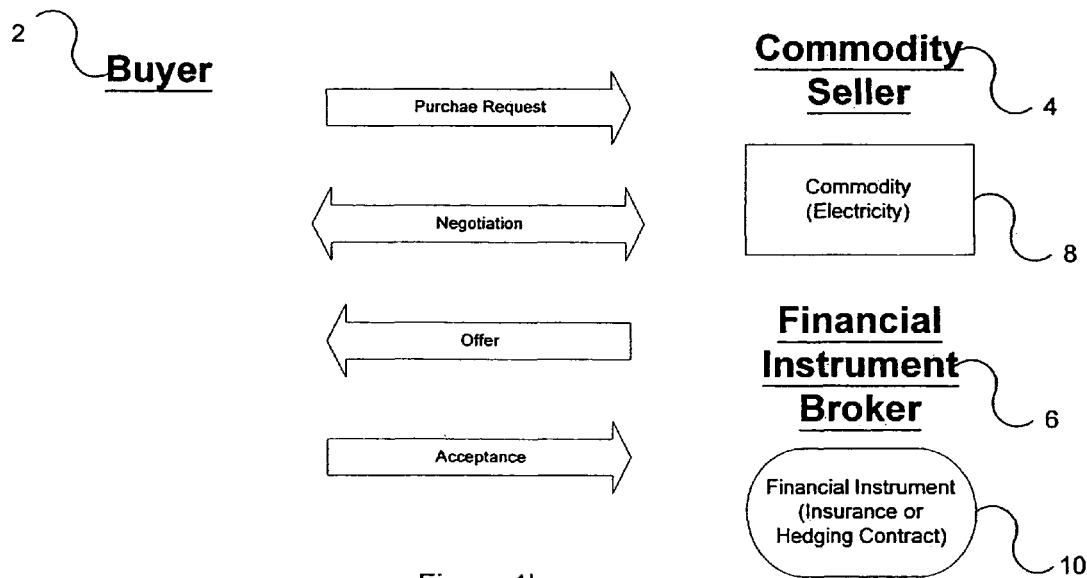
FIG. 1b is an overview description of the operational model of the present invention wherein a buyer purchases a commodity from a commodity seller and a financial instrument from a financial instrument broker.

In a tier-priced industry, the use of a financial instrument to guarantee commodity delivery and lower the cost of delivering the commodity can be implemented in two distinct ways. FIG. 1a illustrates a buyer 2 purchasing a tier-priced commodity 8 bundled with a financial instrument 10 from a commodity seller 4. In this example the buyer negotiates the purchase of the bundled commodity 8 and financial instrument 10 with the commodity seller 4. The financial instrument 10 would be triggered and executed to absorb the additional costs of purchasing spot power under the conditions described in the financial instrument. In the preferred embodiment the tier-priced commodity is electrical power being sold by a generating utility or broker and the financial instrument is an insurance policy or hedging contract. The buyer 2 may be any consumer of the purchased commodity 8 (i.e. an individual, a large manufacturing concern, a rural cooperative, a municipality or another generating utility) and the seller 4 may be a commodity generating utility or commodity reseller. In one embodiment, the financial instrument 10 is offered by the commodity provider 4 along with the commodity 8 as a bundled product (the purchase price of the commodity includes the purchase price of the financial instrument used to guarantee the delivery of the commodity). FIG. 1b illustrates an alternative embodiment in which the buyer 2 purchases the financial instrument 10 and the commodity 8 separately. In this example the financial instrument 10 is purchased from a financial instrument broker 6 such as an insurance company (in the case of an insurance policy) or brokerage house (in the case of a hedging contract or derivative contract).

Figure 2A:
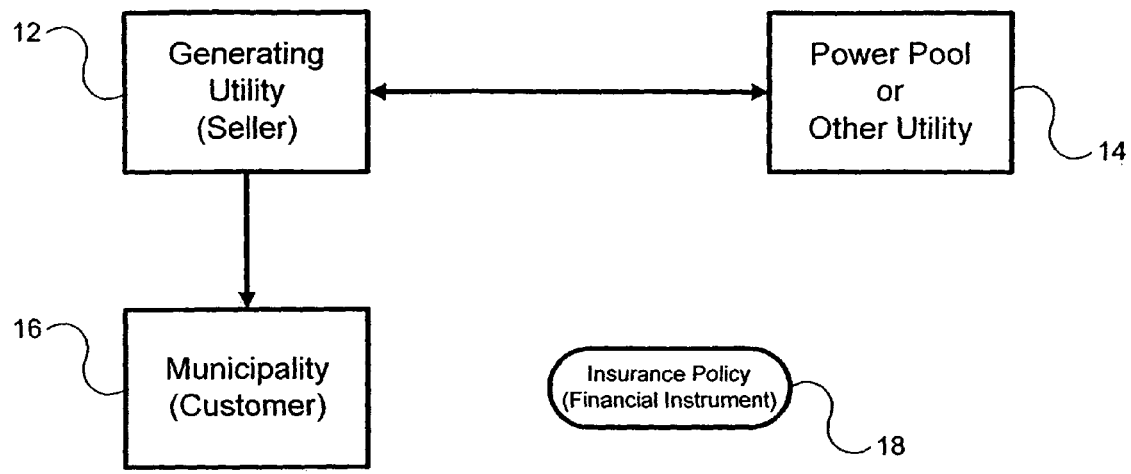
FIG. 2a illustrates one embodiment of the present invention in which a financial instrument is in place guaranteeing delivery of electrical power and there is no interruption.
Figure 2B:
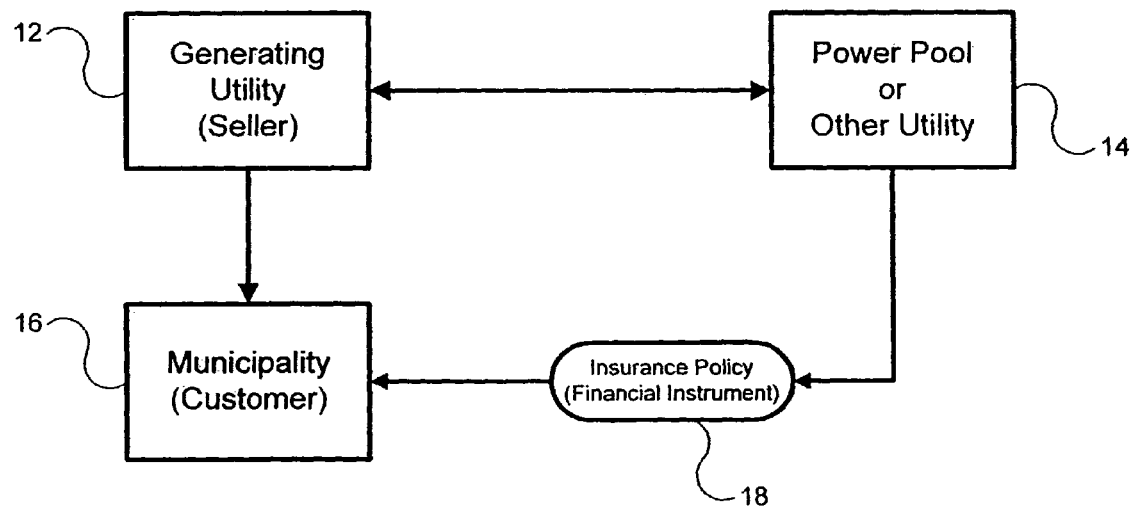
FIG. 2b illustrates one embodiment of the present invention in which a financial instrument is in place guaranteeing delivery of electrical power and there is an interruption.

FIG. 2a illustrates the use of an insurance policy 18 to protect against an interruption in service to a customer 16 (in this example a municipality). In FIG. 2a a municipality 16 purchases interruptible power from a generating utility 12. The municipality 16 has also purchased an insurance policy 18 as part of a bundled product from the generating utility 12 or an insurance company such as the financial instrument broker 10 (See FIG. 1b). If there is no interruption in service then the municipality 16 receives its power as contracted from the generating utility 12 and there is no need to purchase spot power from another utility 14 (or the power pool). Purchasing a commodity supported by an insurance policy 18 allows the municipality 12 to purchase power at a reduced interruptible rate. The insurance policy 18 takes effect if there is an interruption in service governed by the terms of the policy. Typically, the terms of the insurance policy will cover foreseeable interruptions and not force majeure events. The insurance policy 18 is designed to take into account the risks associated with purchasing interruptible power. A risk coefficient may be calculated based on the risks associated with purchasing the commodity at the lower tier, for example. These risks include historical data regarding the weather in and around the municipality 16 (the consuming area), the current/predicted future capacity of the generating utility 12 and the current/predicted future demands of the municipality 16 (the load profile). If there is an interruption in service, the insurance policy 18 will provide the finances necessary to allow the generating utility 12 to purchase or generate needed power to supplement the interruption. In the case where the municipality 16 holds the insurance policy 18 (purchased it separately from the commodity) the financial proceeds of the policy are paid to the generating utility 12 or an alternative source 14 or a transmitting utility to augment supply by purchasing or generating additional power. Referring to FIG. 2b, with the insurance policy 18 covering the cost of purchasing expensive spot power, the alternative source 14 (the providing utility or power pool) would transfer the supplemental power to the municipality through the generating utility 12 or through another system (transmitting/distributing utility) depending upon the circumstances.

When a municipality 16 (or any customer for that matter) is the insurance policy holder, an agreement among the electricity provider, the insurance provider, and the end-user would be structured to provide interruptible power under a mutually acceptable set of circumstances. This agreement allows the generating utility 12, through their trading floor, to purchase power for interruptions on behalf of the municipality 16 (including the end users), using funds provided by the insurance policy held by the municipality 16. In an alternative embodiment the end-users would contract directly with the generating utility and the insurance provider.

Figure 3A:
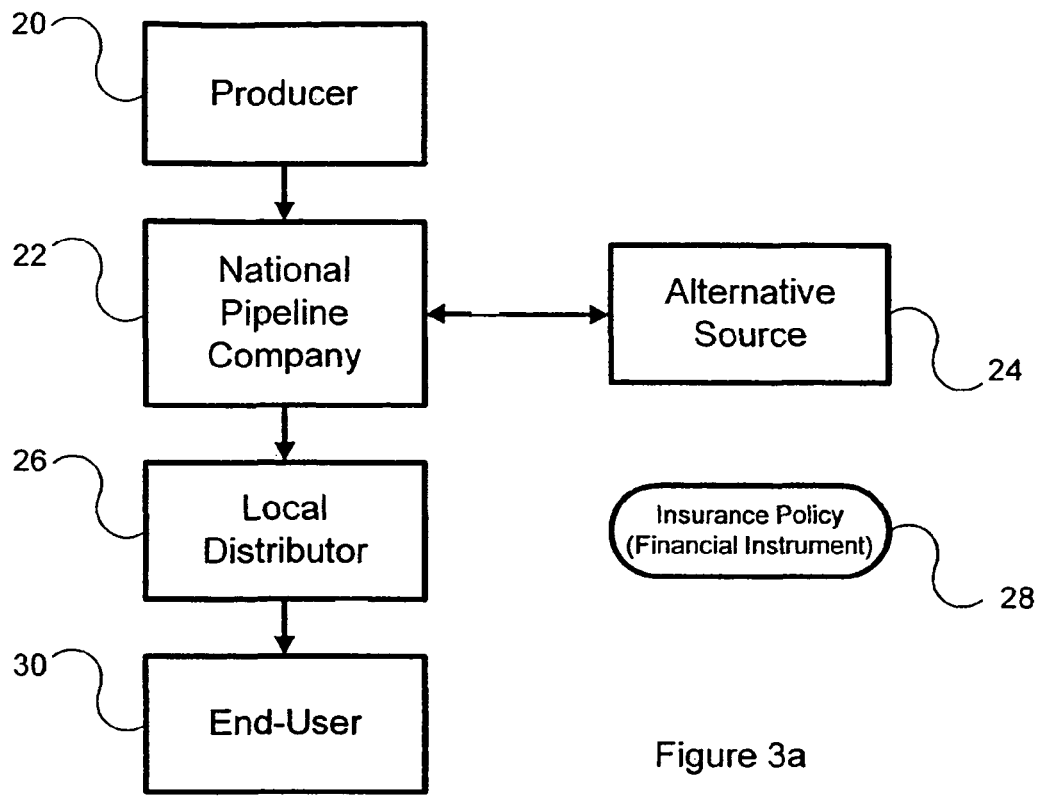
FIG. 3a illustrates one embodiment of the present invention in which a financial instrument is in place guaranteeing delivery of natural gas and there is no interruption.
Figure 3B:
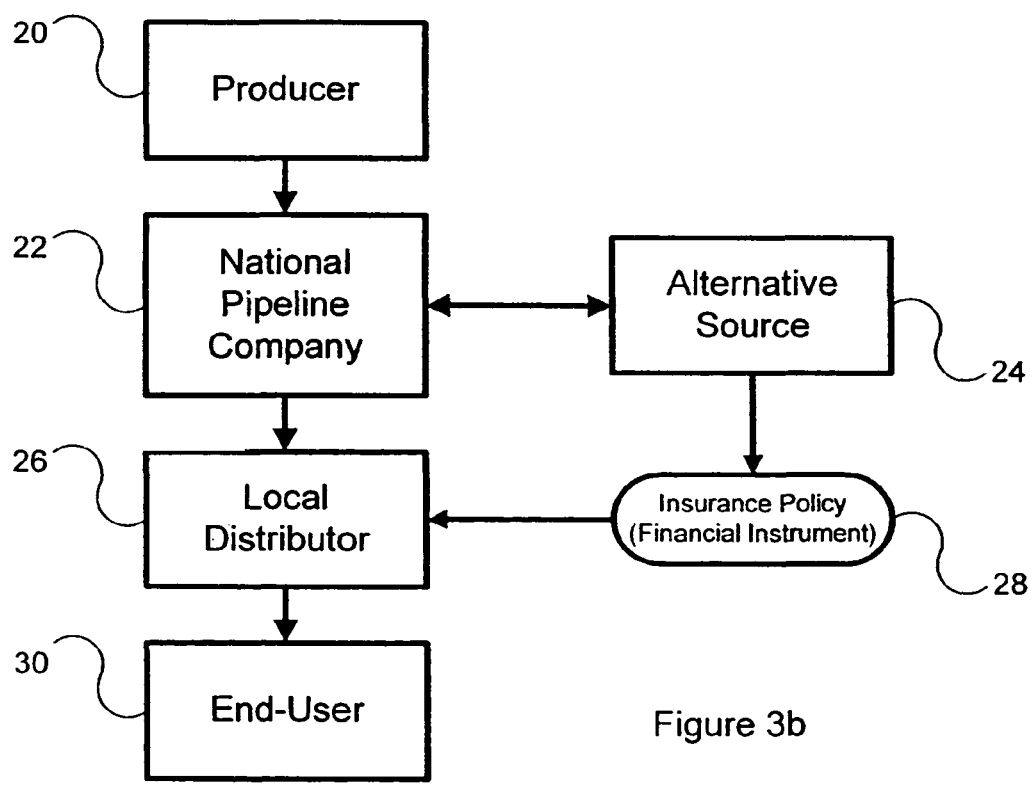
FIG. 3b illustrates one embodiment of the present invention in which a financial instrument is in place guaranteeing delivery of natural gas and there is an interruption.

FIGS. 3a and 3b illustrate the application of the present invention to the natural gas industry. A natural gas producer 20 provides gas to a national pipeline company 22 which is conceptually similar to the national electrical grid. The national pipeline company 22 provides gas to a local distributor 26 who in turn provides gas to the end-user 30. In the event of an interruption in gas service (which may be occasioned for equally predictable reasons as they are in the electrical industry) an insurance policy 28 (or other financial instrument) will provide the funds to supplement the interruption from an alternative source 24.

The implementation of the present invention from the generating utility and end-user may be accomplished via traditional business means (typically written agreements) or via a computerized transaction. If the transaction is carried out over a computer network (via the Internet in the preferred embodiment), a wholesale or retail customer would be able to purchase the utility commodity from the provider either with or without an attached financial instrument. The purchaser would also be able to purchase the commodity from one provider and the financial instrument from a separate financial broker. Sales by a utility may be conditioned upon the purchase of an insurance policy by the purchaser. In another embodiment, an alternative energy provider may sell hedge contracts supported by its own power generating surplus. In yet another embodiment, purchasers bid on available power and financial instrument from a variety of different providers.

Figure 4:
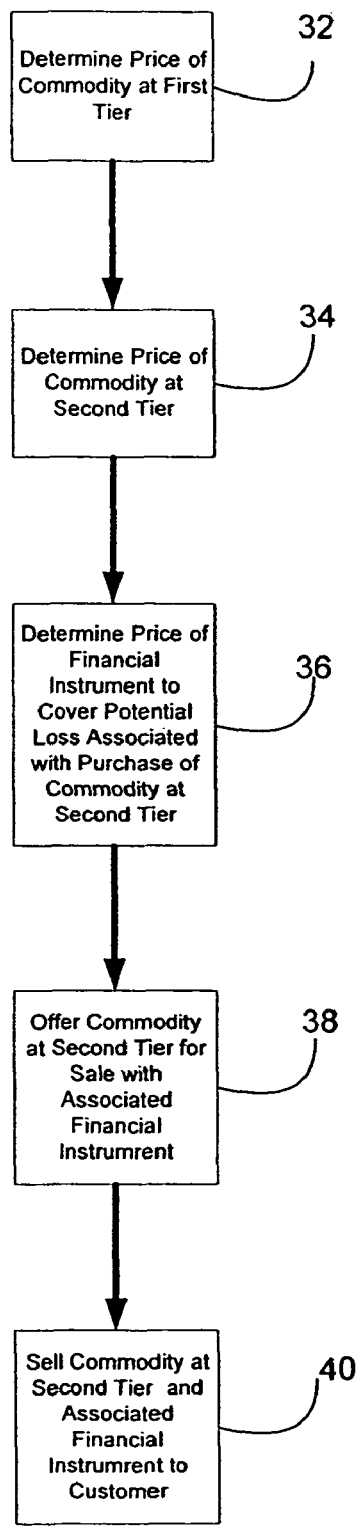
FIG. 4 is a flowchart illustrating the method steps of one embodiment of the present invention.

FIG. 4 illustrates the method steps of the present invention as they would be carried out through traditional processes or as implemented in software on one or more computers. At step 32 a price is determined for the commodity at a first tier. In the preferred embodiment, this will be the price for firm electrical power in a particular class (residential, industrial, etc.) which will be the most expensive electrical power available in that class. At step 34 the price for the commodity at a second tier within the same class is determined. In the preferred embodiment, this will be interruptible power in the same class available for a substantially lower price than the power in the first tier. The price determinations made in steps 32 and 34 are accomplished using any of a number of well known techniques. One source of information useful in determining these prices is Federal Energy Regulatory Commission (FERC) Open-Access Same-time Information System (OASIS) provides information about available transmission capacity. At step 36 a price is determined for a financial instrument to cover the loss which would be suffered in the event of a foreseeable interruption in service associated with the purchase of the second tier commodity. Typically the financial instrument is designed to cover the potential foreseeable interruptions and not force majeure events. However, coverage for force majeure events could be included in an alternative embodiment of the present invention. At step 38 the generating utility or broker offers the bundled commodity (interruptible power) and financial instrument (typically an insurance policy). The second tier commodity and indemnifying financial instrument are then sold to a customer at step 40.

Figure 5A:
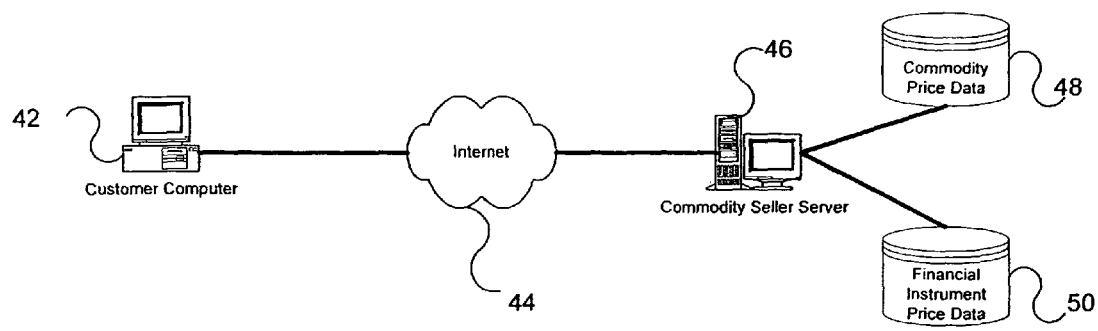
FIG. 5a is a diagram illustrating the use of a client computer to contact a commodity seller computer to carry out the present invention.
Figure 5B:
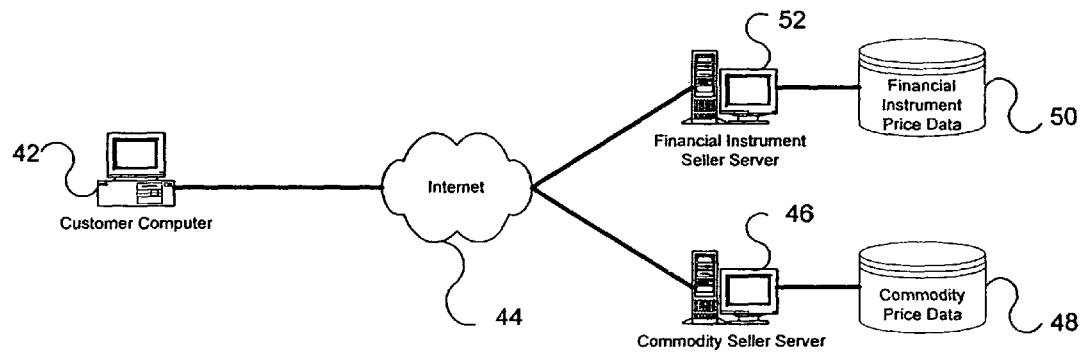
FIG. 5b is a diagram illustrating the use of a client computer to contact a commodity seller computer and a financial instrument seller computer to carry out the method of the present invention.

FIGS. 5a and 5b illustrate a system implementing the present invention over a computer network. A customer using customer computer 42 would connect to a commodity seller computer 46 via a computer network such as the Internet 44. The commodity seller computer 46 has access to commodity price data 48 and financial instrument price data 50. The price data may be stored on the commodity seller server 46 or another computer. FIG. 5b illustrates a bifurcated system in which there is a financial instrument seller computer 52 in addition to the commodity seller computer 46. In the preferred embodiment the interface between the customer computer 42 and the commodity seller computer 46 and the financial instrument seller computer 52 is implemented as a web page accessible to the customer via the World Wide Web. In an alternate embodiment the customer would contact a brokering computer which would in turn contact the commodity seller computer 46 and the financial instrument seller computer 52.

Figure 6:
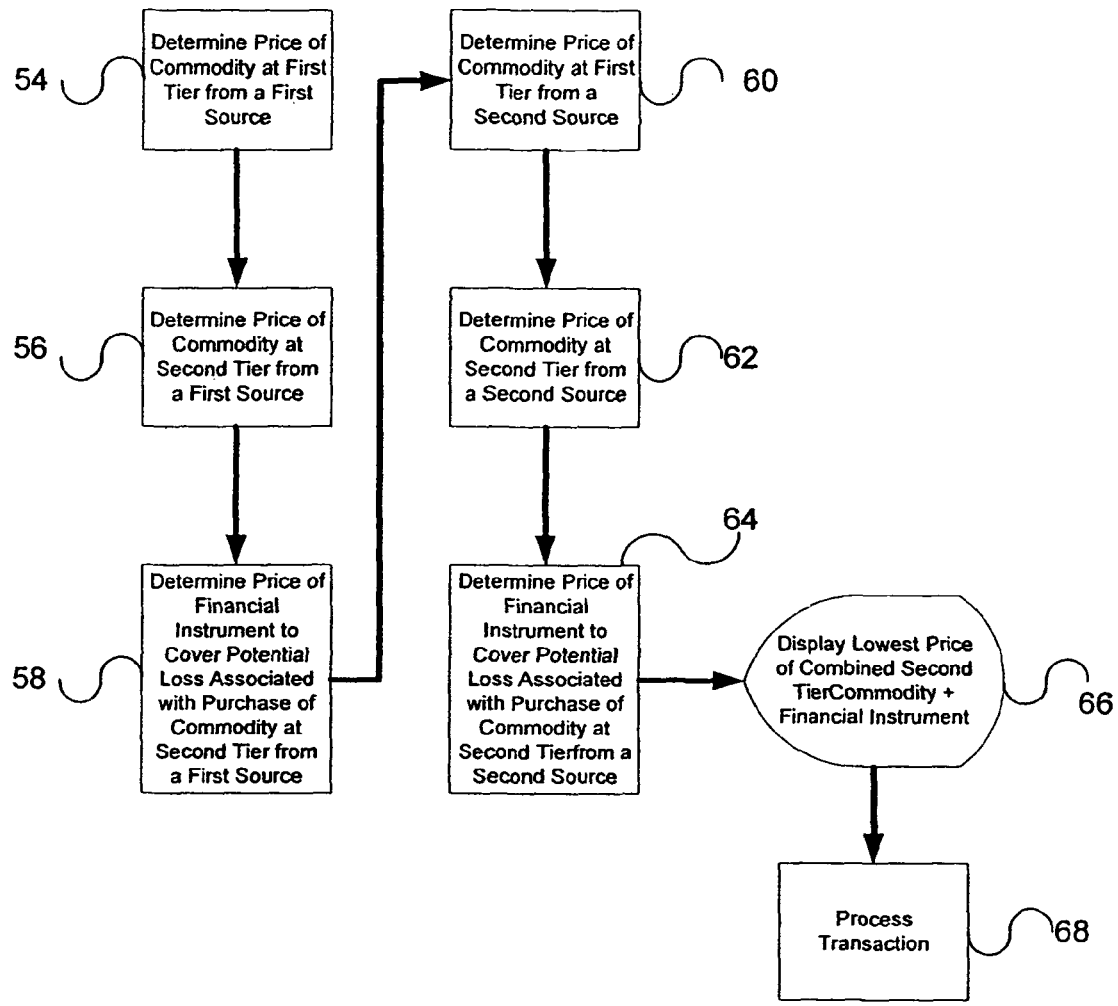
FIG. 6 is a flowchart illustrating the method steps of one embodiment of the present invention.

Referring to FIG. 6, the method steps of the present invention are illustrated for an embodiment in which a customer is presented with the lower of two prices from two or more sources. At step 54 the price for a first tier commodity from a first source is determined. At step 56 the price for a second tier commodity from a first source is determined. At step 58 a price is determined for a financial instrument to cover the loss which would be suffered in the event of a foreseeable interruption in service associated with the purchase of the second tier commodity from a first source. At step 60 the price for a first tier commodity from a second source is determined. At step 62 the price for a second tier commodity from a second source is determined. At step 64 a price is determined for a financial instrument to cover the loss which would be suffered in the event of a foreseeable interruption in service associated with the purchase of the second tier commodity from a second source. At step 66 the lowest combined price for a second tier commodity and bundled financial instrument is displayed to a customer and at step 68 the transaction is processed.

Figure 7:
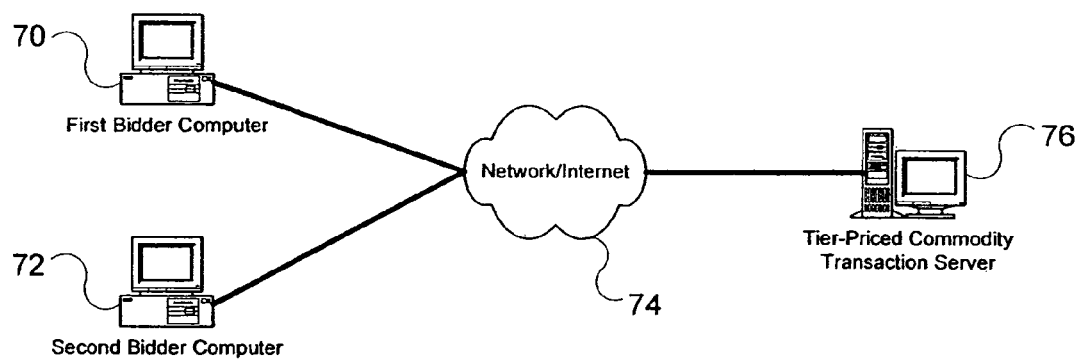
FIG. 7 is a diagram illustrating a multiple bid implementation of the system of the present invention.

FIG. 7 illustrates an implementation of the present invention facilitating an online auction for a commodity and bundled financial instrument. A first bidder computer 70 and a second bidder computer 72 are connected via a computer network such as the Internet 74 to a tier-priced commodity transaction server 76. The tier-priced commodity transaction server 76 presents the first bidder computer 70 and the second bidder computer 72 starting bids (prices personalized for each participating bidder) for a given commodity at a specified tier and an associated financial instrument. The prices may be different for each bidder. The potential bids are accepted by the tier-priced commodity transaction server 76 and the commodity and bundled financial instrument is sold to the highest bidder.

More particularly, the starting price or bid for the first bundled product for the first bidder and the starting price or bid for the second bundled product for the second bidder are determined by the transaction server 76 and provided to the first bidder computer 70 and the second bidder computer 72, respectively, via the network 74. The network may be the Internet. The respective prices are displayed to the first and second bidders by the first and second bidder computers 70, 72, respectively. The first and second bidders submit their bids to the commodity transaction server 76, via their respective computers 70, 72, and the network 74. The commodity transaction server 76 sells the first bundled product to the first bidder if the first bidder exceeds the first price by a greater amount than the second bidder exceeds the second price. The commodity transaction server 76 sells the second bundled product to the second bidder if the second bidder exceeds the second price by a greater amount than the first bidder exceeds the first price.

Figure 8:
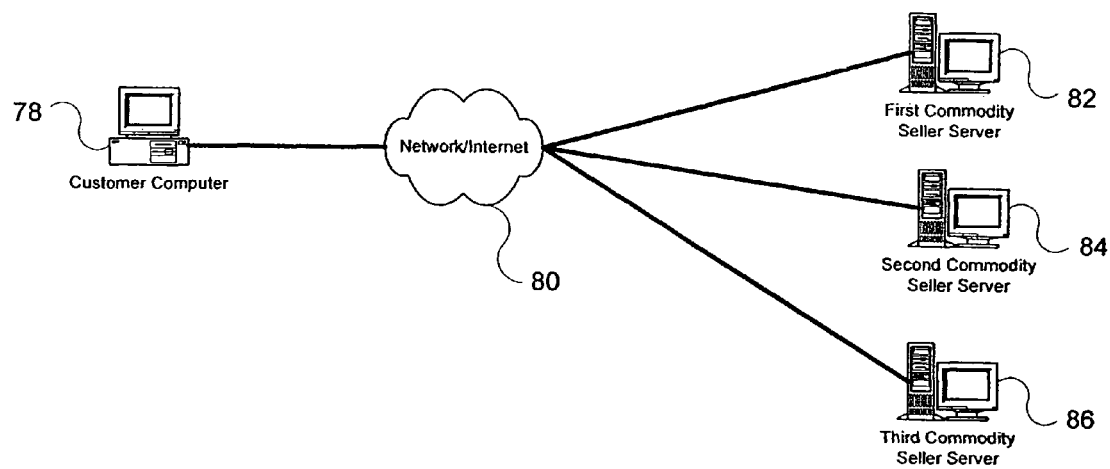
FIG. 8 illustrates the system of the present invention being used to solicit quotes from more than one seller.

FIG. 8 shows customer computer 78 connecting to commodity seller computers 82, 84, and 86 via a network, such as the Internet 80. The customer computer 78 presents the commodity seller computers 82, 84, and 86 with its commodity requirements and information necessary to determine the cost of the requested commodity and the associated financial instrument. In an alternate embodiment, the customer computer 78 connects to a querying computer which collects information from the customer, retrieves the price combinations from the commodity seller computers 82, 84, and 86 and returns the best offer price to the customer. In yet another embodiment the querying computer contacts both commodity seller computers 82, 84, and 86 and financial instrument selling computers and presents the customer with the best combined price.

Although the foregoing invention has been described in some detail for the purpose of clarity of understanding, it will be apparent that certain changes and modifications may be practiced within the scope of the appended claims. Accordingly, the present embodiments are to be considered illustrative and not restrictive, and the invention is not to be limited to the details given herein, but may be modified within the scope and equivalents of the appended claims.

I claim:

1. A method of managing a sale of a commodity, the method comprising:

providing, by a first processor, over a network, respective prices for bundled products to respective second processors of each of a plurality of respective bidders, wherein each respective price is provided to a respective second processor, each bundled product comprising the commodity and a respective financial instrument to indemnify against loss associated with at least one risk related to purchase of the commodity;

displaying to each respective bidder the respective price for the respective bidder, by a respective display coupled to each respective second processor;

receiving, by the first processor, via the network, bids for respective bundled products from at least some of the respective second bidders;

determining, by the first processor, which of the bidders exceeds their respective price by a greater amount; and selling the respective bundled product to the respective bidder who exceeds their respective price by the greatest amount.

2. The method of claim 1, further comprising:
selling, by the first processor, over the network, the respective bundled product to a respective bidder who exceeds their respective price by the greatest amount.

3. The method of claim 1, comprising:
determining the respective prices by the first processor based, at least in part, on a price for the commodity for sale to each respective bidder with the at least one risk and a value for the financial instrument to indemnify each respective bidder.

4. The method of claim 3, wherein:
the values of respective financial instruments are based, at least in part, on one or more factors associated with each respective bidder.

5. The method of claim 1, wherein the commodity is chosen from the group consisting of electricity, natural gas, water, and telecommunications services.

6. The method of claim 1, wherein:
the at least one risk includes a risk of interruptions in delivery to each bidder; and
respective insurance instruments indemnify against loss associated with the interruptions.

7. The method of claim 1, wherein the financial instrument is an insurance instrument.

8. A method for managing the sale of a commodity, comprising:
displaying to a first bidder a first price for purchase by the first bidder of a first bundled product comprising a commodity and a first insurance instrument to indemnify the first bidder against loss associated with at least one risk related to the purchase of the commodity, on a first display device coupled to a first processor;

displaying to a second bidder a second price for purchase by the second bidder a second bundled commodity comprising the commodity and a second insurance instrument designed to indemnify the second bidder against loss associated with at least one risk related to the purchase of the commodity, on a second display device different than the first display device, coupled to a second processor different from the first processor;

receiving bids by a third processor different than the first and second processors, for the first bundled product from the first bidder and for the second bundled product from the second bidder, from the first and second processors, respectively;

determining, by the third processor, which of the first and second bidders exceeds their respective first and second prices by a greater amount; and selling the first bundled product to the first bidder if the first bidder exceeds the first price by a greater amount than the second bidder exceeds the second price or selling the second bundled product to the second bidder if the second bidder exceeds the second price by a greater amount than the first bidder exceeds the first price.

9. The method of claim 8, wherein the first price and the second price are different.

10. The method of claim 8, wherein the commodity is chosen from the group consisting of electricity, natural gas, water, and telecommunications bandwidth.

11. The method of claim 10, wherein:
the at least one risk includes a risk of interruptions in delivery; and
the first and second insurance instruments indemnify against loss associated with interruptions in delivery of the commodity to first and second bidders, respectively.

12. The method of claim 11, wherein the price of the first and second insurance instruments are based, at least in part, on one or more factors associated with the first and second bidders, respectively.

13. The method of claim 8, wherein:
the at least one risk includes a risk of interruptions in delivery; and
the first and second insurance instruments indemnify against loss associated with interruptions in delivery of the commodity to the first and second bidders, respectively.

14. The method of claim 8, wherein the price of the first and second insurance instruments are based upon one or more factors associated with the first and second bidders, respectively.

15. The method of claim 8, comprising receiving the bids from the first and second processors, via at least one network.

16. The method of claim 15, wherein the at least one network comprises the Internet.

17. A method of managing a sale of a commodity, comprising:
receiving by a first computer associated with a first party, from a second computer, a first price for a bundled product comprising a commodity and a first financial instrument to indemnify against loss associated with at least one risk related to purchase of the commodity, via a first network, the first price being determined by the second computer;

receiving by a third computer associated with a second party, from the second computer, a second price for a bundled product comprising the commodity and a second financial instrument to indemnify against loss associated with at least one risk related purchase of the commodity, via a second network, the second price being determined by the second computer;

sending a first bid from the first computer to the second computer via the first network; and sending a second bid from the third computer to the second computer via the second network;

wherein:
if the second computer determines that the first bid exceeds the first price by more than the second bid exceeds the second price, the first party receives the bundled product for the first price; and if the second computer determines that the second party exceeds the second price by more than the first party exceeds the first price, the second party receives the bundled product for the second price.

18. The method of claim 17, wherein the first and second networks comprise the Internet.

19. The method of claim 17, wherein the first and second networks are the same.

* * * * *